United States Patent [19]
Aoyama et al.

[11] Patent Number: 5,579,034
[45] Date of Patent: Nov. 26, 1996

[54] COLOR DATA INPUT APPARATUS

[75] Inventors: Takaharu Aoyama, Koganei; Jun Oshima, Akigawa; Emiko Morooka, Fuchu; Kayoko Hashimoto; Takashi Kojo, both of Ome, all of Japan

[73] Assignee: Casio Computer Co., Ltd., Tokyo, Japan

[21] Appl. No.: 359,033

[22] Filed: Dec. 19, 1994

[30] Foreign Application Priority Data

Dec. 28, 1993 [JP] Japan .................................. 5-353811

[51] Int. Cl.⁶ ............................................... G09G 5/00
[52] U.S. Cl. .......................... 345/168; 345/172; 345/150
[58] Field of Search .................................. 345/168, 169, 345/172, 170, 171, 150, 186, 185, 199, 201, 156, 901, 903; 341/22, 23; 364/708.1, 709.01, 709.08, 709.1, 709.12, 709.14, 709.15; 379/355; 400/486, 487, 489; 395/131; 348/77

[56] References Cited

U.S. PATENT DOCUMENTS

| | | | |
|---|---|---|---|
| 4,709,230 | 11/1987 | Popowski et al. | 345/156 |
| 4,862,497 | 8/1989 | Seto et al. | 379/355 |
| 4,878,055 | 10/1989 | Kasahara | 341/23 |

*Primary Examiner*—Richard Hjerpe
*Assistant Examiner*—Xiao M. Wu
*Attorney, Agent, or Firm*—Frishauf, Holtz, Goodman, Langer & Chick

[57] ABSTRACT

A color data input apparatus is provided with plural key sheets and a key sheet selecting keys. Color data, which are stored in a memory, are assigned to each of the plural key sheets. Further, input keys are provided for selecting one of color data assigned to each of the plural key sheets. To designate a color, a key sheet, to which a pertinent color data is assigned, is selected by the key sheet selecting key, and then an input key corresponding to the pertinent color data is operated, whereby the pertinent color data is selected from among the color data of the selected key sheet and a color of the selected color data is displayed on a display unit. An advice data on a combination of colors are stored in an advice data memory is provided. When two colors are selected in the above way, an advice on a combination of the two read out colors is also displayed and is made reference for designing dresses.

5 Claims, 9 Drawing Sheets

ROM

| FUNDAMENTAL COLORS / COLORS TO BE COMBINED | RED | ORANGE | GREEN | YELLOW |
|---|---|---|---|---|
| WHITE | CHARMING | CALM | ⋮ | ⋮ |
| BLACK | GENTLE | ⋮ | ⋮ | ⋮ |
| YELLOW GREEN | ⋮ | ⋮ | ⋮ | ⋮ |
| ⋮ | ⋮ | ⋮ | ⋮ | ⋮ |

FIG.8
COLOR
SENSE
( 1 )
( RED )
( WHITE )
[ OK ]
COLOR OF
YOUR DRESS?    (A)
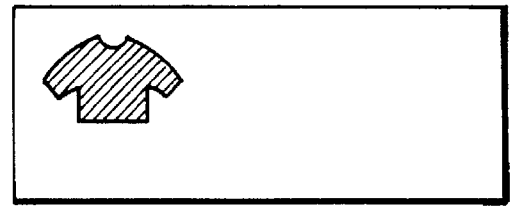
(B)
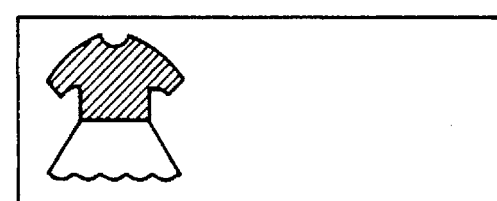
COLOR TO BE
COMBINED?    (C)
(D)
YOU LOOK
CHARMING    (E)

COLOR DATA INPUT APPARATUS

BACKGROUND OF THE INVENTION

1. Field of the Invention

The present invention relates to a color data input apparatus and more particularly to a color data input apparatus to which a number of color data are input with minimum number of keys, and which controls various displays based on input color data.

2. Description of Related Art

Apparatus having color display units are known which receive color data and control color images displayed on the color display units based on the received color data. In these conventional apparatus, when color data is input by means of input keys, a color of the image displayed on the color display unit is changed to a color represented by the input color data. These apparatus are often used, for example, for designing dresses.

Meanwhile, a number of colors are expected to be processed in these apparatus and, further, if their intermediate colors are included, tremendous number of colors will have to be treated. As a result, the apparatus need to be provided with a large number of keys to designate these tremendous number of colors. The large number of keys, however, prevent to make apparatus comparatively compact in size. Conventional apparatus simply display input color data on the display units.

SUMMARY OF THE INVENTION

The present invention has been made to overcome the above prior art drawback, and has an object to provide a color data input apparatus which is small in size, and is capable of inputting and displaying a number of color data.

According to one aspect of the invention, there is provided a color data input apparatus which comprises:

a housing;

key input means including plural keys mounted on a front surface of said housing;

plural color designating sheet means each having plural color indications to which color data are assigned respectively, the plural color indications being corresponding respectively to the plural keys of said key input means, the color data each representing a color;

memory means for storing the color data assigned to the plural color indications of said plural color designating sheet means;

sheet selecting means for selecting one of the plural color designating sheet means;

reading means for, when one of the plural color designating sheet means is selected by said sheet selecting means and a key of said key input means is operated, reading out from said memory means color data assigned to a color indication of the color designating sheet means selected by said sheet selecting means, the color indication corresponding to the operated key of said key input means; and display means for displaying a color represented by the color data read out by said reading means.

With the above structure, a color data input apparatus can be made compact in size and further such structure allows a number of color data to be entered to the color data input apparatus.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 8 is a view illustrating transitive indications in the first embodiment;

DETAILED DESCRIPTION OF PREFERRED EMBODIMENTS

Now, preferred embodiments of the present invention will be described in detail with reference to the accompanying drawings.

A first embodiment of a color data input apparatus according to the present invention will be described with reference to the accompanying drawings.

Figure 1:
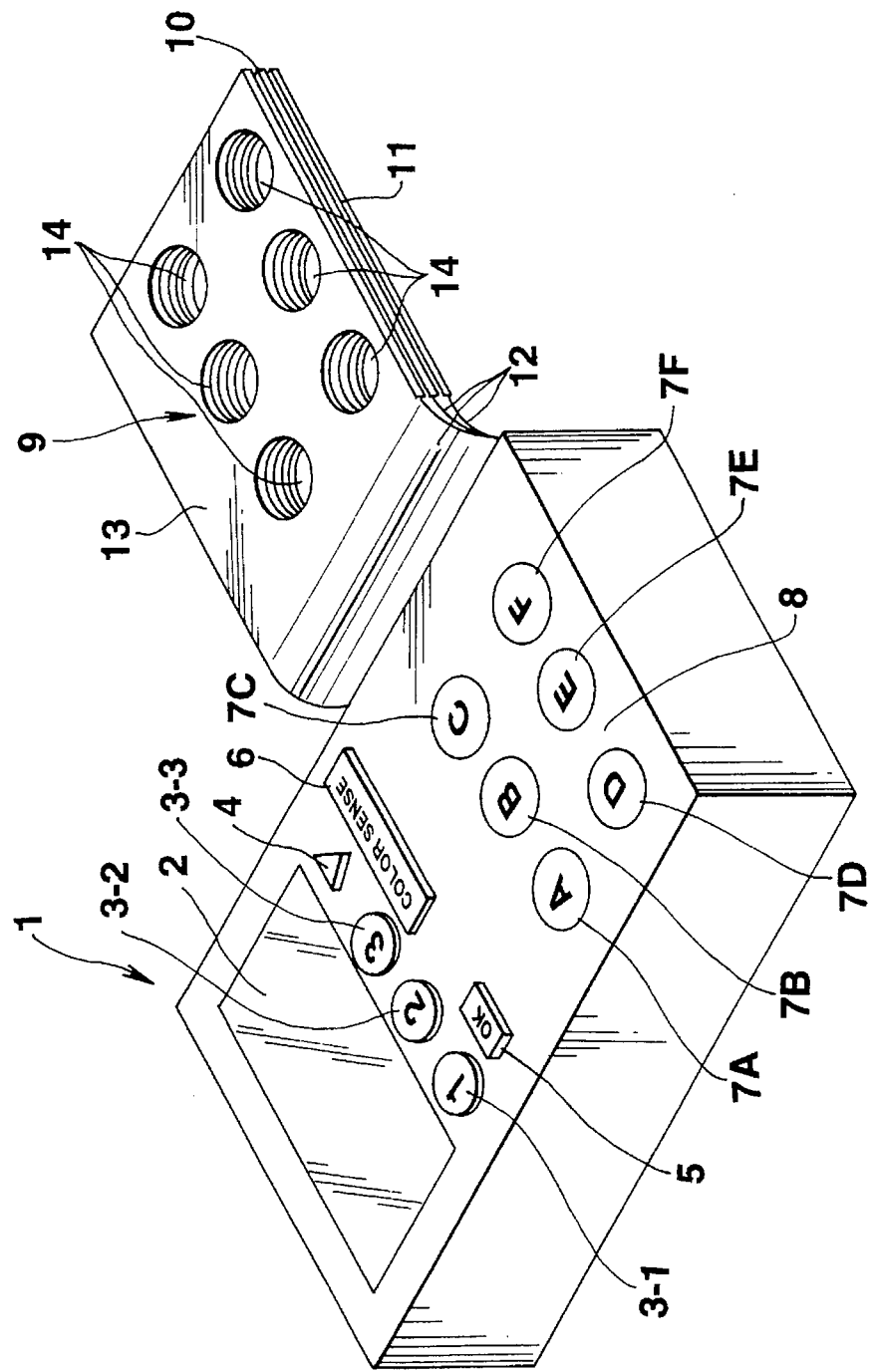
FIG. 1 is a perspective view of a first embodiment of a color data input apparatus according to the present invention.

As shown in FIG. 1, a color liquid crystal display unit 2 (hereafter "color display unit") is provided in a front surface of a body 1 (apparatus body) of the color data input apparatus. Further, there are provided three sheet selecting keys 3-1, 3-2 and 3—3, a ∇ key 4, an OK key 5 and a color sense key 6 in the vicinity of the color display unit 2 on the front surface of the apparatus body 1. Six color designating keys 7A, 7B, 7C, 7D, 7E and 7F are also provided and arranged in two rows on a lower portion 8 (a lower front portion) of the front surface of the apparatus body 1.

Figure 2:
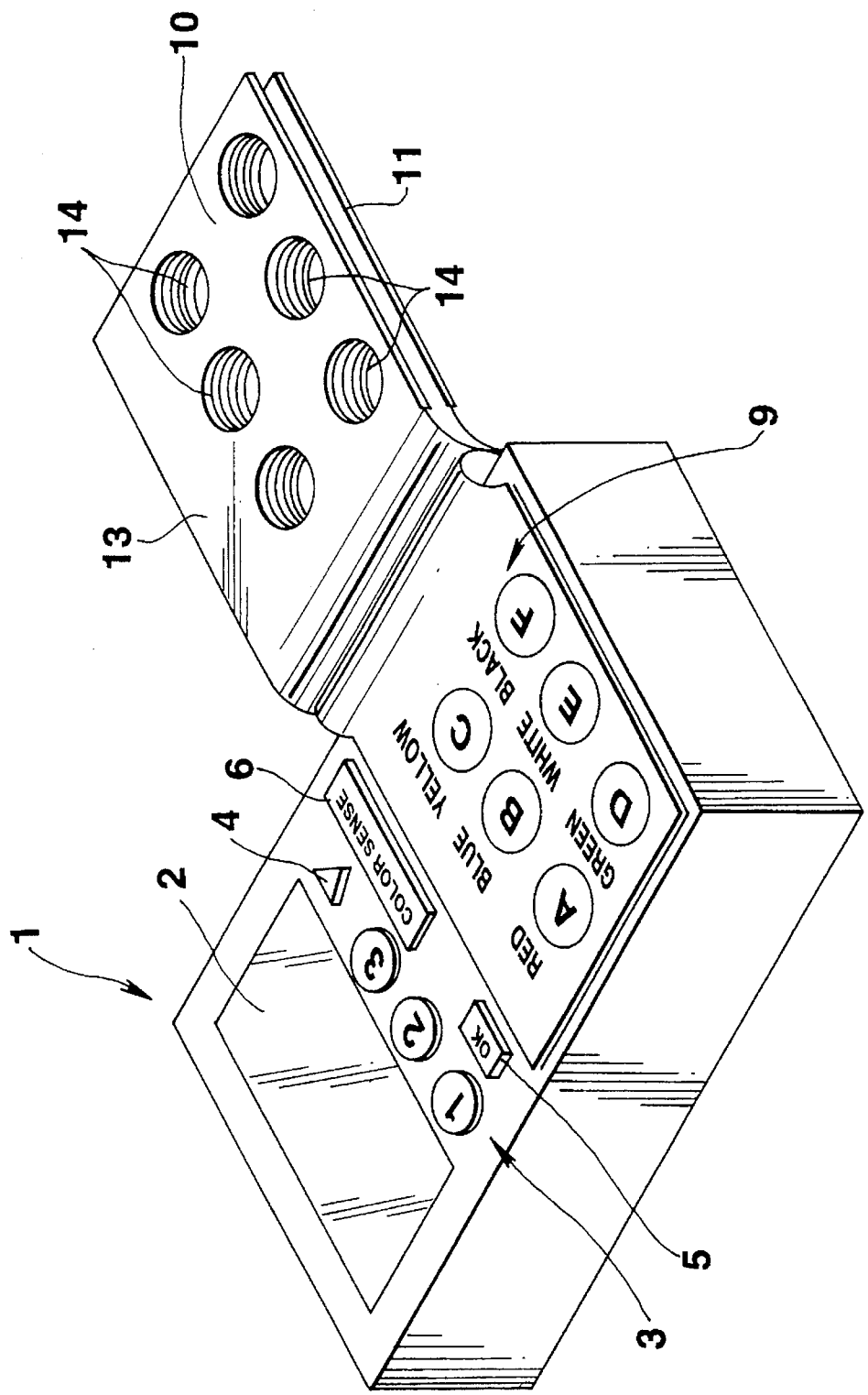
FIG. 2 is a perspective view of the first embodiment of the color data input apparatus with a first key sheet positioned at a predetermined place.

First to third key sheets 9, 10 and 11 are stacked and secured on a side wall next to the lower portion of the apparatus body 1. The stacked key sheets 9–11 each are comprised of a thin portion 12 and a thick portion 13. The thin portions 12 of the stacked key sheets 9–11 are secured on the side wall of the apparatus body 1. Six openings 14 corresponding to the six color designating keys 7A–7F are formed in the thick portions 13 of the key sheets 9–11 such that, when the key sheet is placed so as to cover the lower front portion 8 of the apparatus body 1, the six openings 14 allow the six color designating keys 7A–7F on the lower front portion 8 to be exposed through them respectively, as shown in FIG. 2. Color designating indications such as "red", "black", "yellow" and so on are printed in colors indicated by the respective color designating indications in the vicinity of the openings 14 on the key sheets 9–11.

Figure 3:
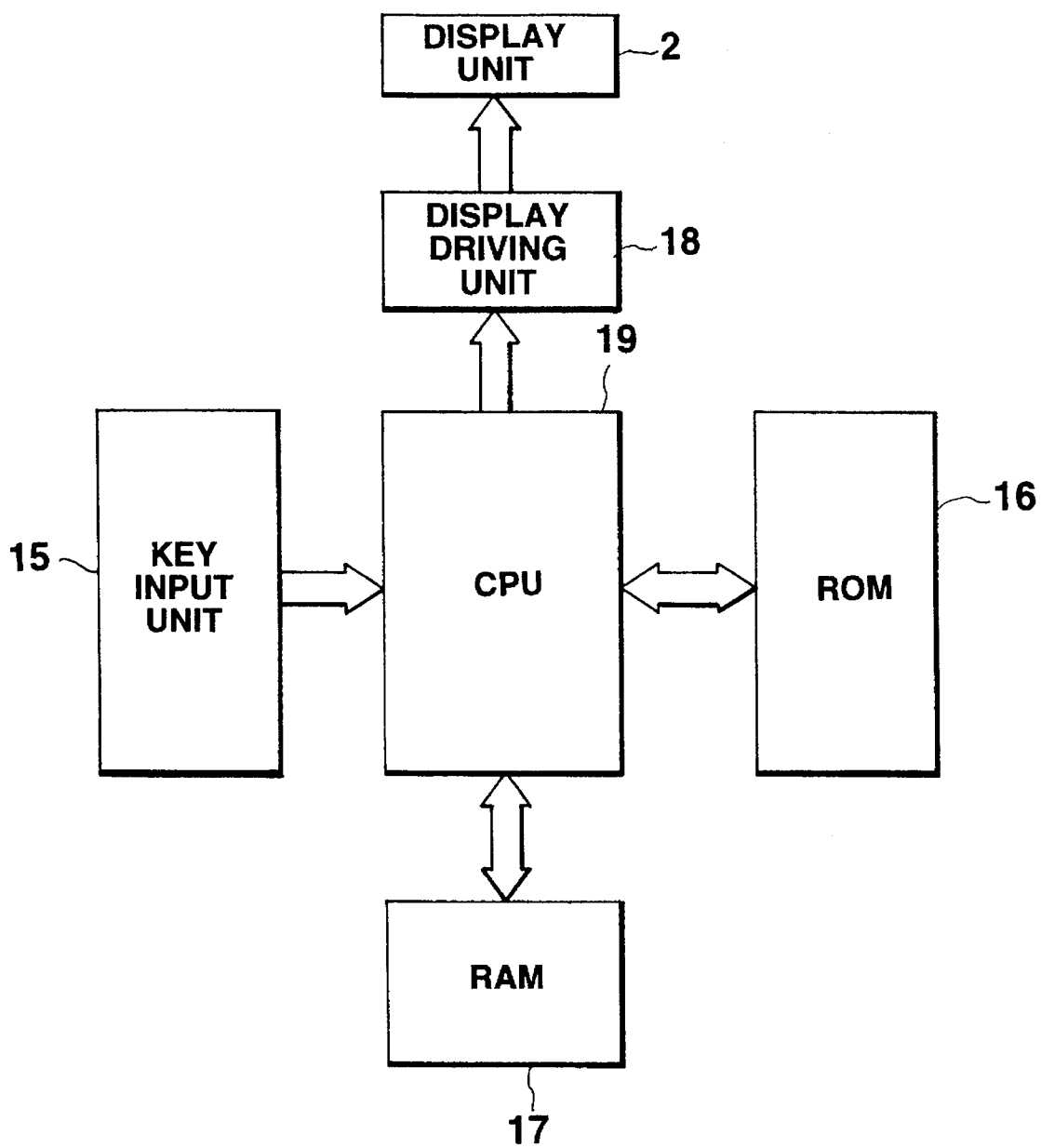
FIG. 3 is a circuit diagram of the first embodiment.

FIG. 3 is a circuit diagram of the first embodiment of the color data input apparatus according to the present invention. In FIG. 3, key signals of the keys 3–7F are supplied to a central processing unit (CPU) 19 from a key input unit 15. Based on the key signals, a program and data stored in a read only memory (ROM) 16 and data stored in a random access memory (RAM) 17, the CPU 19 controls a display driving circuit 18 to drive the color display unit 2.

Figure 4:
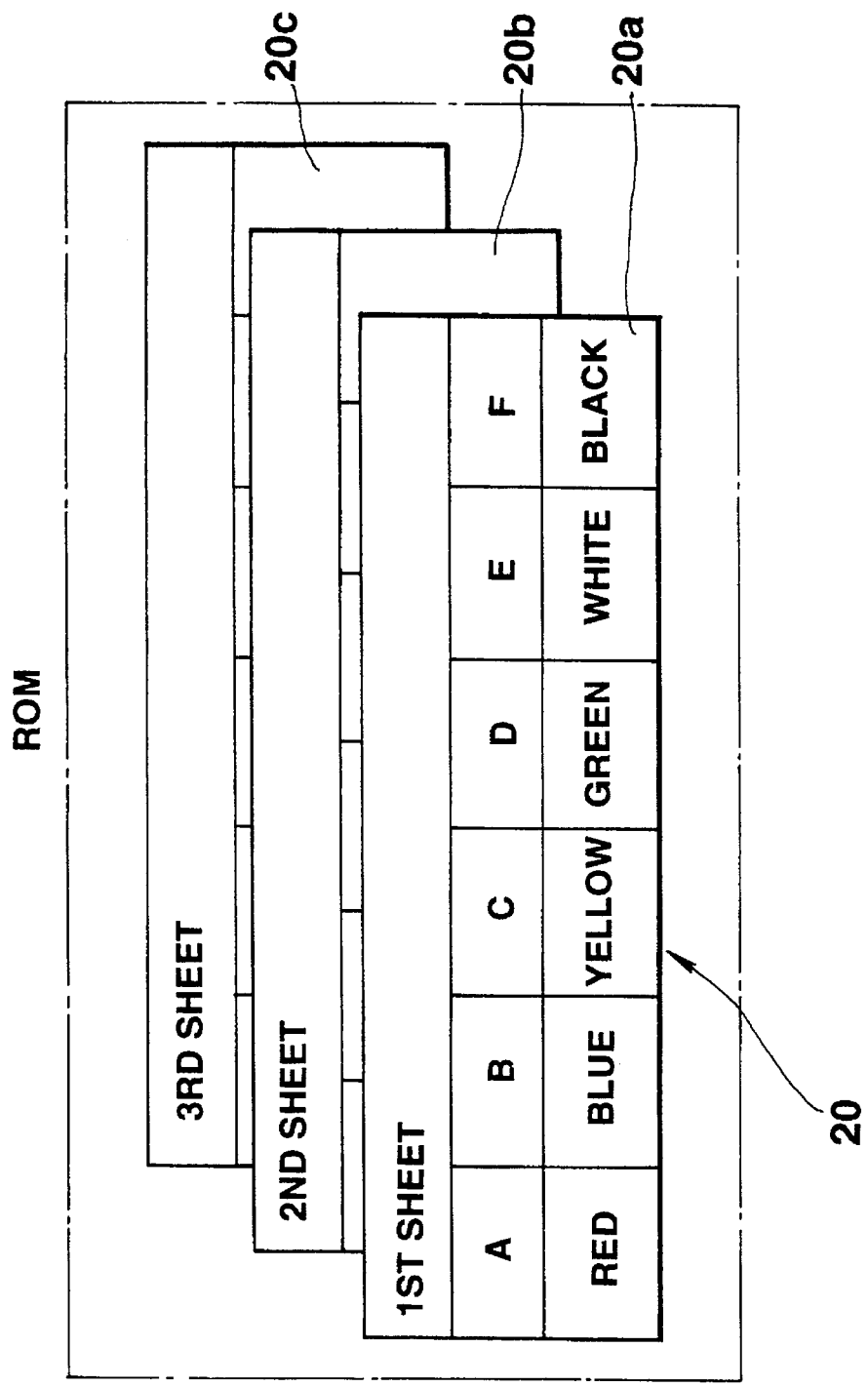
FIG. 4 is a view schematically illustrating a key memories in a read only memory (ROM)
Figures 5, 6:
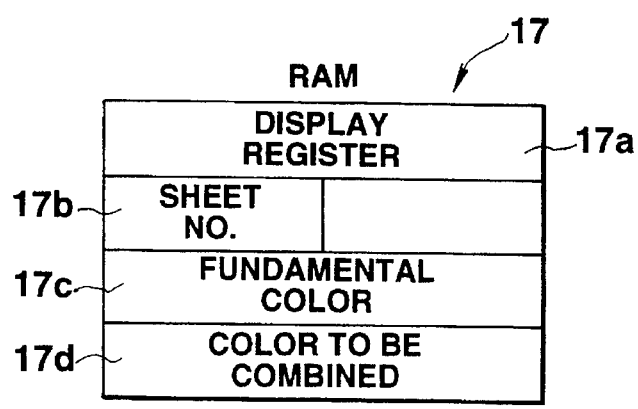
FIG. 5 is a view schematically illustrating a structure of a color sense memory in ROM.
FIG. 6 is a view schematically illustrating a structure of a random access memory (RAM)

In the ROM 16 are stored a key sheet memory 20 schematically shown in FIG. 4 and a color sense memory 21 schematically shown in FIG. 5. The key sheet memory 20 includes first, second and third sheet memories 20a, 20b and 20c, which correspond respectively to the first, second and third key sheets 9–11. In each of the first to third sheet memories 20a, 20b and 20c are stored six symbols A–F corresponding respectively to the color designating keys 7A–7F and color display data corresponding to the color designating indications printed on the corresponding one of the first to third key sheets 9–11. The six symbols A–F and color display data are stored in combination in the first to third sheet memories 20a–20c.

The color sense memory 21 of FIG. 5 stores data in a matrix arrangement. More specifically, in a first row of the first color sense memory 21 are stored indications of fundamental colors and in a first column are stored indications of colors to be combined with the colors indicated in the first row. At crossing areas (or cells) are stored advice data, which give pertinent advice on coordination of colors such as "You look very charming", when wear of colors stored in the first row and column are combined(i.e. when colors are to be worn together).

Meanwhile, the RAM 17 is provided with a display register 17a for storing display data to be displayed on the color display unit 2, as shown in FIG. 6. Further, the RAM 17 is provided with a memory area 17b for storing sheet Nos. of the first to third key sheets 9–11, a memory area 17c for storing the fundamental color data designated by operation of the keys in the key input unit 15 and a memory area 17d for storing color data of a color to be combined with a fundamental color represented by the fundamental color data stored in the memory area 17c.

Figure 7:
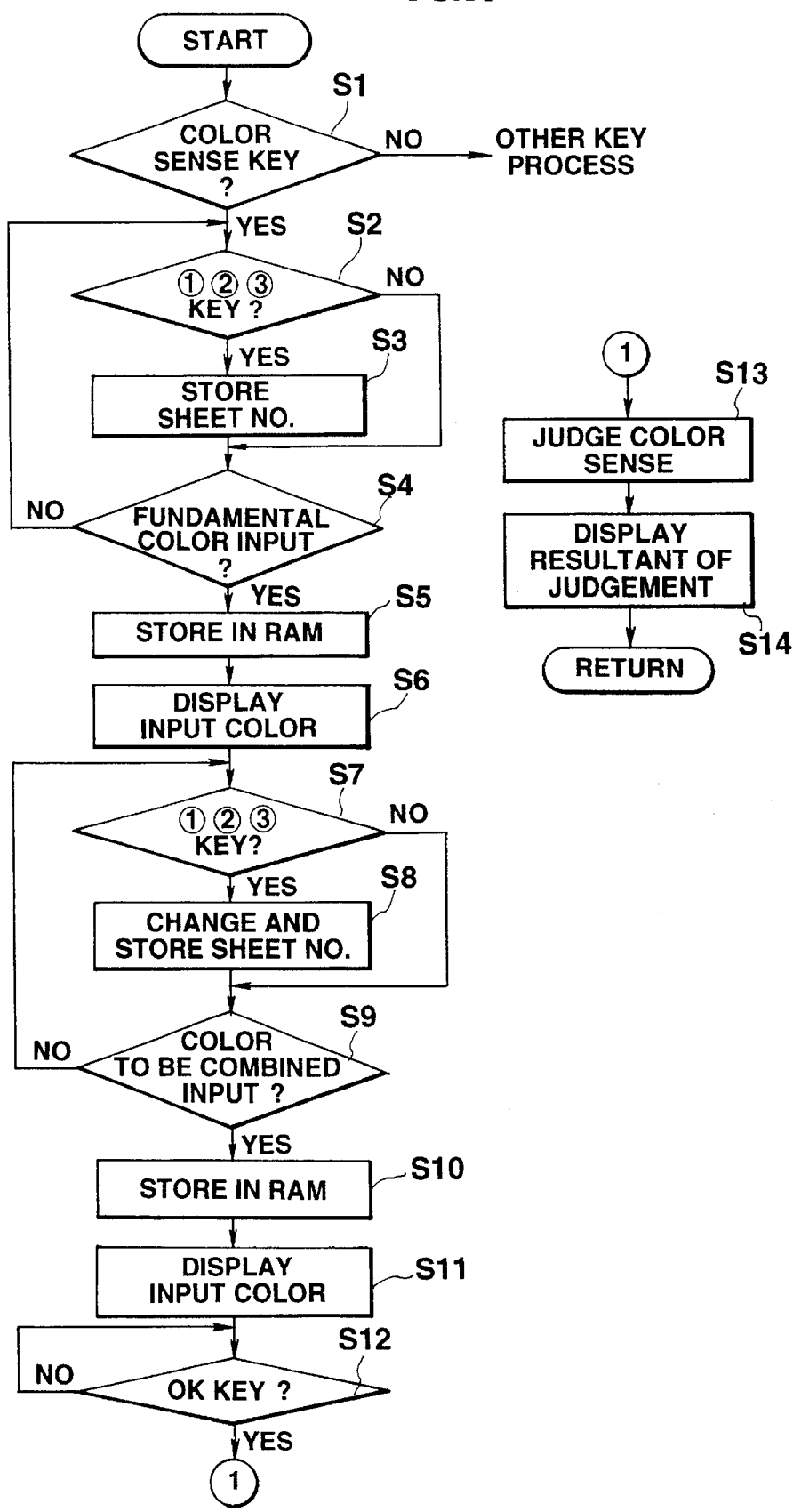
FIG. 7 is a flowchart of a control operation in the first embodiment.

Now, operation of the first embodiment with the above structure will be described. When a power (not shown) is turned on, the CPU 19 starts operation in accordance with a flowchart of FIG. 7. At step S1, it is judged whether the color sense key 6 is turned on. When the color sense key 6 is not turned on, a process in accordance with other key will be executed. When the color sense key 6 is turned on, the operation advances from step S1 to step S2, where an initial indication in a color sense mode is displayed on the display unit 2, i.e., a message of "COLOR OF YOUR DRESS?" (i.e.,shirt) is displayed on the display unit 2, as shown at (A) in FIG. 8.

A user chooses from among the first to third key sheets 9–11 a key sheet on which a color designating indication of a color of the dress that she (or he) to wear this time is printed. For example, when the user intends to wear a red dress, she (or he) chooses the first key sheet 9, on which the color designating indication "red" is printed, and closes or places the first key sheet 9 onto the lower front 14 portion 8 of the apparatus body 1. Then, the user operates one of the sheet selecting keys 3-1, 3-2, 3—3 which corresponds to the closed key sheet. In this case, since the first key sheet 9 is closed, the sheet selecting key 3-1 is operated. Therefore, it is judged "YES" at step S2, and the operation advances from step S2 to step S3, where the sheet No. "1" is stored in the memory area 17b of the RAM 17.

Operation of the color designating key 7A designates a color data "red" corresponding to the symbol "A" in the first sheet memory 20a of FIG. 4. At step S4, color data "red" is selected and read out from the first sheet memory 20a as the fundamental color. Then, since it is judged "YES" at step S4, the operation advances from step S4 to step S5. The read out fundamental color data "red" is stored as the fundamental color in the memory area 17c of the RAM 17 at step S5. The chosen color is displayed and a red upper garment is displayed on the display unit 19 at step S6, as shown at (B) in FIG. 8.

It is judged at step S7 whether anyone of the sheet selecting keys 3-1, 3-2, 3—3 is operated. When it is determined that no sheet selecting key has been operated, the operation advances from step S7 to step S9, where it is judged whether a "color" to be combined with the selected color "red" is entered. When it is judged "NO" at step S9, the processes at steps S7 and S9 are repeatedly executed until it will be judged "YES" at step S7. That is, the CPU 19 is brought in a waiting state for waiting for input of the "color" to be combined with the selected color "red".

While the CPU 19 is in the waiting state, an indication of "COLOR TO BE COMBINED?" is displayed on the display unit 2 as shown at (C) in FIG. 8. For example, if the user chooses a color "white", which is to be combined with the red upper garment, the first key sheet 9, on which the color designating indication "white" is printed is held closed on the lower front portion 8 of the apparatus body 1. When the user chooses a color on the key sheets other than the first key sheet 9, she operates the corresponding sheet selecting key (3-2 or 3—3). Therefore, it is judged "YES" at step S7, and the operation advances from step S7 to step S8, where the corresponding sheet No. is stored in the memory area 17b of the RAM 17.

In this case, since a color to choose is in the first sheet 9, none of the sheet selecting keys is operated and it is judged "NO" at step S7. Then, the operation advances to step S9, where the color designating key 7E is operated to choose a color "white". The operation advances from step S9 to step S10, where color data of "white" to be combined with the color red" is stored in the memory area 17d of the RAM 17. Further, the chosen color is displayed, and the red upper garment and a white skirt are displayed on the color display unit 2, at step S11 as shown at (D) in FIG. 8.

When the user operates the OK key 5 after confirming the displayed colors, then the operation advances from step S12 to step S13, where a judgement on color sense is performed based on the fundament color "red" and the color "white" to be combined with "red" using the color sense memory 21 of FIG. 5. At the crossing area of the fundamental color indication "red" and the color "white" to be combined, character data of "YOU LOOK VERY CHARMING!" is stored. The character data is read out and displayed next to the red upper garment and the white skirt on the display unit 2 as shown at (E) in FIG. 8.

Figure 9:
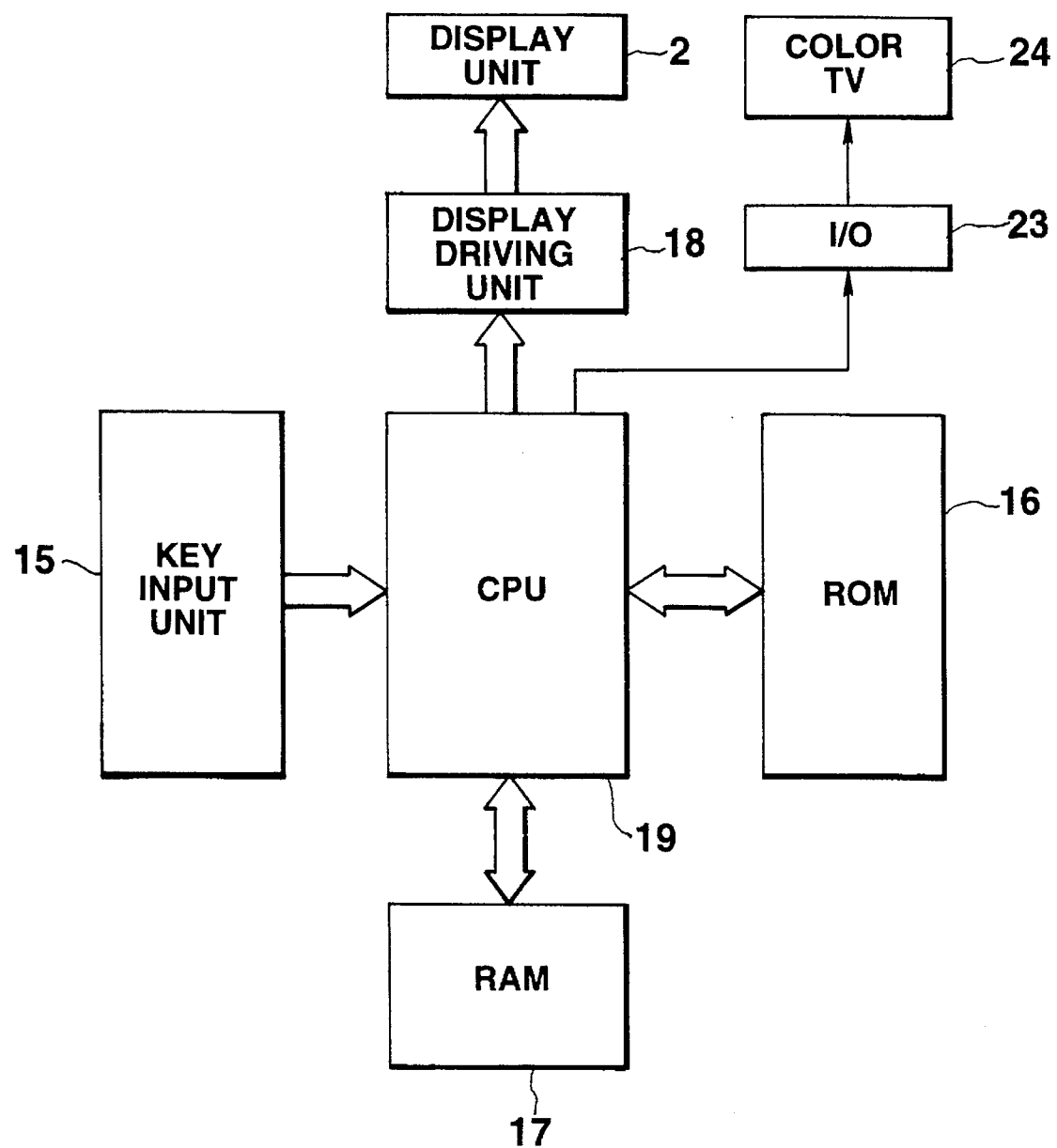
FIG. 9 is a circuit diagram of a second embodiment of the color data input apparatus.

FIG. 9 is a circuit diagram of a second embodiment. The display unit is a monochrome liquid crystal display unit 2. The CPU 19 is connected with a color TV receiver 24 through an I/O port 23. The CPU 19 controls the display driving circuit 18 to display indications for selection shown at (A) and (C) of FIG. 8 on the display unit 2, and further controls to display illustrations of (B), (D) and (E) of FIG. 8 on a display unit of the color TV receiver 24. As described above, the illustrations of (B), (D) and (E) are displayed on the large scaled display unit of the color TV receiver 24.

Figure 10:
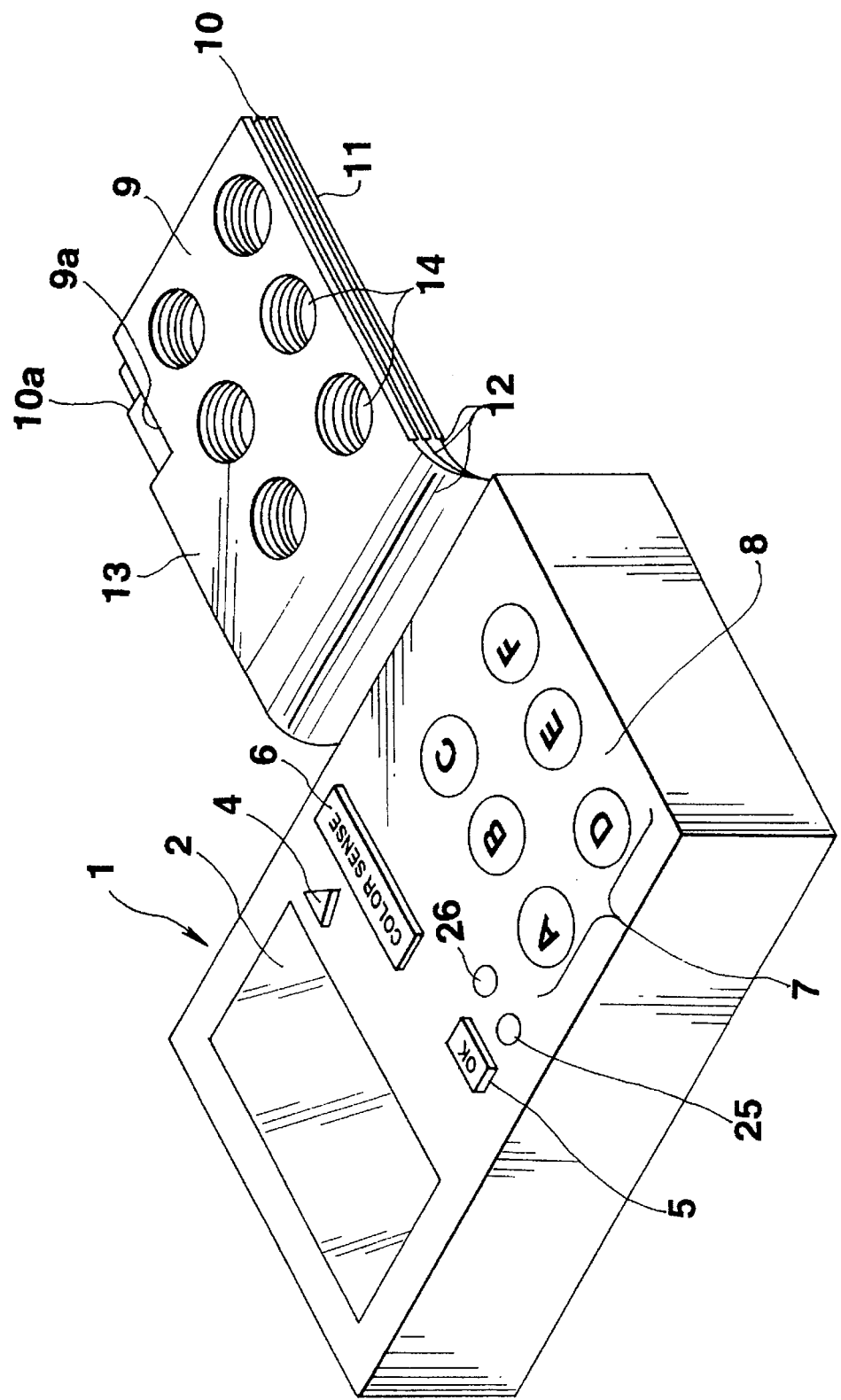
FIG. 10 is a perspective view of a third embodiment of the color data input apparatus.

FIG. 10 is a perspective view of a third embodiment of the present invention. The first and second key sheets 9 and 10 are formed with cutouts 9a and 10a at free end corners of the sheets, respectively, as clearly shown in FIG. 10. The third key sheet 11 has no cutout. The cutouts 9a and 10a are different in size. That is, the cutouts 9a and 10a have the same width but the cutout 9a has a longer length that the cutout 10a. Meanwhile a pair of light receiving sensors 25 and 26 are installed side by side on the lower front portion 8 of the apparatus body 1. The light receiving sensors 25, 26 keep ON while they are receiving light externally supplied thereto, and the light receiving sensors 25, 26 keep OFF when light is cut off. The cutout 9a is formed in the key sheet 9 such that both the light receiving sensors 25, 26 are exposed when the key sheet 9a is closed on the lower front portion 8 of the apparatus body 1. The cutout 10a is formed in the key sheet 10 such that only the light receiving sensors 25 is exposed when the key sheet 9, 10 are closed on the lower portion 8 of the display apparatus body 1.

In the color data input apparatus with the above struture, when the first key sheet 9 is closed on the lower front portion 8 of the apparatus body 1, both the light receiving sensors 25, 26 are exposed through the cutout 9a and are kept ON. Then, it is determined that only the first key sheet 9 is closed on the lower front portion 8. When the first and second key sheets 9, 10 are closed on the lower portion 8 of the apparatus body 1, only the light receiving sensor 25 is exposed through the cutout 10a and is kept ON, and the light receiving sensor 26 is covered by the key sheet 9 and is kept OFF. Then, it is determined that the first and second key sheets 9 and 10 are closed on the lower front portion 8. Further, when the first to third key sheets 9–11 are closed on the lower front portion 8 of the apparatus body 1, both the light receiving sensors 25, 26 are covered by the key sheet 11 and are kept OFF. Then, it is determined that the first to third key sheets 9–11 are closed on the lower front portion 8.

The outputs of the light receiving sensors 25, 26 are encoded into "11", "10" or "00". Using these encoded outputs, it can be determined which key sheet is closed on the apparatus body 1. More specifically, if the encoded output is "11", it is determined that only the first key sheet 9 is closed. If the encoded output is "10", it is determined that the first and second key sheets 9, 10 are closed on the apparatus body 1. If the encoded output is "00", it is determined that all the second and third key sheets 9, 10, 11 are closed on the apparatus body 1. Therefore, the sheet selecting keys 3-1, 3-2 and 3—3 can be omitted in the third embodiment, saving the space on the front surface of the apparatus body 1, and a controlling process of FIG. 7 will be performed in a simple manner.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A color data input apparatus comprising:

a housing;

key input means including plural keys mounted on a front surface of said housing;

plural color designating sheet means each having plural color indications to which color data are assigned respectively, the plural color indications being corresponding respectively to the plural keys of said key input means, the color data each representing a color;

color data memory means for storing the color data assigned to the plural color indications of said plural color designating sheet means;

sheet selecting means for selecting one of the plural color designating sheet means;

reading means for, when one of the plural color designating sheet means is selected by said sheet selecting means and a key of said key input means is operated, reading out from said color data memory means color data assigned to a color indication of the color designating sheet means selected by said sheet selecting means, the color indication corresponding to the operated key of said key input means;

read out data memory means for storing color data read out by said reading means;

advice data memory means for storing advice data on a combination of plural color data among the color data stored in said color data memory means;

search means for searching through said advice data memory means for advice data on a combination of plural color data stored in said read out data memory means; and display means for displaying the advice data searched by said search means.

2. A color data input apparatus according to claim 1, further comprising display control means for controlling said display means to display a selected color read out by said reading means.

3. A color data input apparatus according to claim 1, wherein said advice data memory means stores advice data on combinations of colors of garments that are to be worn together.

4. A color data input apparatus according to claim 1, wherein:

said plural color designating sheets are adapted to be placed on the front surface of said housing, and are formed with cutouts which are different in size, respectively; and said sheet selecting means comprises cutout detecting means for detecting a size of the cutout formed in said color designating sheet means, when said color designating sheet means is placed on the front surface of said housing; and means for selecting one of said color designating sheet means depending on the resultant of the detection by said cutout detecting means.

5. A color data input apparatus according to claim 1, wherein:

said sheet selecting means comprises:

plural light receiving sensors mounted on the front surface of said housing, for receiving light externally supplied thereto to detect a size of the cutout formed in the color designating sheet means, when said color designating sheet means is placed on the front surface of said housing; and means for selecting one of said color designating sheet means which are placed on the front surface of said housing, depending which one of said light receiving sensors is optically shielded by the color designating sheet means placed on the front surface of said housing.

* * * * *